Oct. 11, 1932.  W. W. POTTER  1,881,928
AUTOMATIC METAL TURNING LATHE
Filed April 7, 1927   5 Sheets-Sheet 1

FIG. 1.

INVENTOR
W. W. Potter
BY Chas. J. Williamson
ATTORNEY

Oct. 11, 1932.  W. W. POTTER  1,881,928

AUTOMATIC METAL TURNING LATHE

Filed April 7, 1927  5 Sheets-Sheet 2

INVENTOR
W. W. Potter
BY
Chas. J. Williamson
ATTORNEY

Patented Oct. 11, 1932

1,881,928

UNITED STATES PATENT OFFICE

WILLIAM WALLACE POTTER, OF PAWTUCKET, RHODE ISLAND

AUTOMATIC METAL TURNING LATHE

Application filed April 7, 1927. Serial No. 181,837.

The object of the invention is to make certain improvements in metal working machines and, more particularly, of the class known as automatic chucking machines. The machine which I show in the drawings, as one embodiment of my invention, has features of construction and advantage as follows:

First. It is possible to stop the spindle while the tool slides are operating on the fast motion and still have the feed movements of the tool slides governed by the rotation of the work spindle.

Second. The means for driving tool slide enable the cam drum to be stationary during the idle movements of the slide, and therefore, the drum kept in complete synchronism with the operatively related various other members of the machine.

Third. Location of drum so that the distance between the slide and drum is the minimum and so that the drive from the drum to the slide is in the most direct line possible. The width of the cam drum as exemplified in the case of the cross slide drum is the minimum.

Fourth. A more advantageous location of the cross slide actuating drum.

Fifth. Means for instantaneously operating any of the controlling clutches on the machine automatically by power and at any time.

Sixth. An advantageous construction of the ways of the machine.

The invention consists in whatever is described by or is included within the terms or scope of the appended claims.

It will conduce to a better understanding of the detailed description which follows to give in advance a general description of the machine shown in the drawings, as one embodiment of the invention. Said machine comprises a headstock in which is mounted a horizontal work spindle, which carries a chuck and is provided with turret and cross slides, which are reciprocated by cam drums that are geared to and receive motion from a feed shaft. The spindle and the feed shaft may be revolved at different speeds which are automatically selected, and there is a driving connection between the spindle and the feed shaft by which the rate of feed movements of the tools is controlled by the spindle speed, and provision is made by which during the idle movements of the tools towards and from the work which are produced by a constant high speed shaft, the rotation of the spindle will be stopped so that during such idle movements of the tools the work piece in the chuck will not be revolved, one advantage of which is that tool marks on the work due to unintentional or accidental contact of tools in their idle motions cannot occur. The change speed gearing for varying the rate of revolution of the spindle and of the feed shaft includes clutches that are under the control of a dog wheel or drum, which though its peripheral motion at the time the clutches are to be shifted is very slow results in instantaneous shifting of the clutches, because the dogs are utilized merely to trip devices which require but little dog wheel motion for that purpose that bring into action power-operated, clutch-shifting mechanism, which includes a constantly reciprocating member always ready promptly to act and to act through power to instantaneously shift the clutches. An important feature of the machine in this connection is the possibility while a particular tool is cutting to increase the speed of feed to compensate for reduction of rate of revolution of the work as the tool proceeds from the work periphery inward, the importance of this feature lying in the fact that it means more rapid production of work by the machine.

With this brief or general description, the explanation in detail of what is shown in the drawings will now be undertaken.

Figure 1:
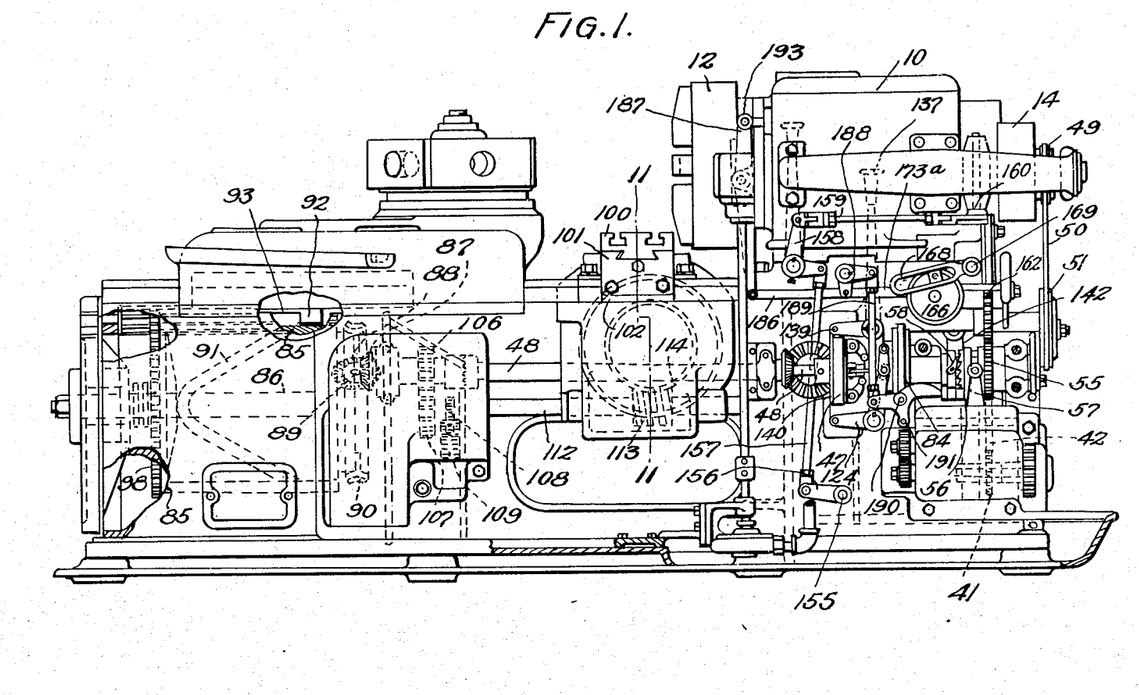
Fig. 1 is a rear elevation of a machine embodying the invention.
Figure 2:
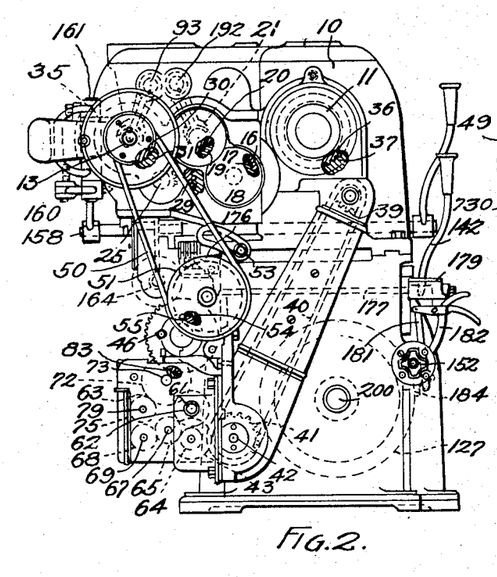
Fig. 2 is an end elevation looking from the headstock end of the machine.
Figure 3:
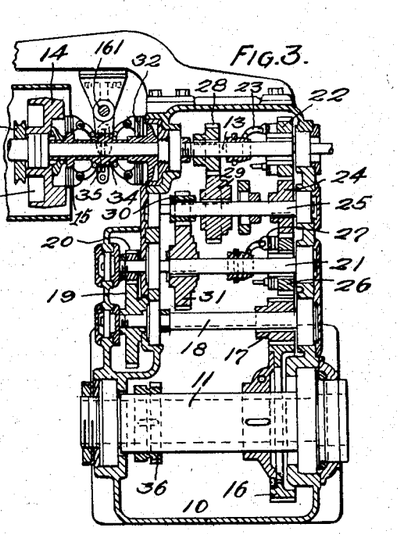
Fig. 3 is a horizontal section through the headstock.

Referring particularly to Figs. 1, 2 and 3, it will be seen that in the headstock 10, is journalled the horizontal spindle 11, having at one end the work-holding chuck 12, and that by trains of gearing presently to be described, the spindle may be driven at any one of several speeds from a parallel shaft, 13, upon which is loosely mounted a band pulley 14, to which driving power is supplied, and which by a friction clutch 15, may be clutched to or disconnected from the shaft 13, the clutch 15, being operated as hereinafter explained. Keyed to the spindle is a gear 16, in mesh with a pinion 17, on a parallel shaft 18 which shaft 18, by gears 19 and 20, is geared to another parallel shaft, 21 which by two trains of gears is connected with the shaft, 13. One of these trains consists of a gear 22, loose on the shaft 13, which may by a clutch 23, be clutched to and unclutched from said shaft, a gear 24, meshing with the gear 22, and fixed to shaft 25 and a gear 26, meshing with gear 24, and loose on shaft 21, which when clutched thereto by a friction clutch 27, drives the shaft 21, and through gears 19 and 20, drives the spindle. Another gear train between the pulley driven shaft 13, and shaft 21, includes gear 28, keyed to shaft 13, a gear 29, meshing with gear 28, on shaft 25, and adapted by a well-known ratchet device (not shown) to be clutched to shaft 25, when the latter does not receive motion from gear 24, a pinion, 30, fixed to shaft 25, and a gear 31, in mesh with and driven by pinion 30, and which gear 31 is also adapted to be clutched by a ratchet device to shaft 21, to drive the same when the loose gear 26, does not drive shaft 21. When gear 22 is clutched to shaft 13, and gear 26, is loose from shaft 21, the spindle drive is from shaft 13, by way of gear 22, through gear 24, shaft 25, pinion 30 and gear 31. When both gears 22 and 26 are clutched to their respective shafts, the drive from shaft 13, is through gears 22, 24 and 25, to shaft 21, and when both gears 22, 25 and 26 are unclutched from their respective shafts, the drive from shaft 13 to the spindle is through the train that includes gears 13, 29, 30 and 31. Thus, the spindle may be run at various speeds through the various trains shown. And when the shaft 13, is unclutched from the drive pulley 14, by shifting clutch 15, then the spindle stops, and to assure that it shall then instantly stop, a friction brake, 32, is keyed to the shaft, 13, which is moved into contact with a stationary brake body 33, on the headstock, when the clutch, 15, is disengaged, the same sliding collar or thimble, 34, operated by the same yoke, 35, acting on both clutch and brake.

The driving connection between spindle and feed shaft by which the spindle speeds and tool feeds are tied together during cutting includes a gear 36, on the spindle, a gear 37, meshing therewith on a shaft 38, (see Figs. 2 and 4) a sprocket wheel 39, on shaft 38, a sprocket chain 40, from wheel 39, to a wheel 41, on a shaft 42, a gear 43, on shaft 42, meshing with and driving a gear 44, on shaft 45, which by one of several trains of gears of various speeds, drives a shaft 46, which by a clutch 47, may be clutched to or unclutched from the feed shaft 48, that extends longitudinally at the back of the machine, and, as afterwards explained, has driving connections with the cam drums for the turret and cross slide and with the dog wheel or drum which automatically controls the spindle and tool slide motions.

Besides the various speeds at which the speed shaft may be run from the spindle for cutting, said feed shaft may be revolved at a high and constant speed for the idle motions of the tool slides, independently of the spindle by power taken from the driving pulley 14. For this purpose a grooved pulley 49, is fixed to the driving pulley 14, and a V-belt 50, connects it with a grooved pulley 51, on a shaft 52, carried by an arm 53, that is pivoted to shaft 46, for adjustment to tighten the belt, and a pinion 54, on shaft 52, meshing with and driving a gear 55, loose on shaft 46, but which by a sliding clutch collar 56, shiftable by a yoke, 57, into engagement with a clutch 58, on shaft 46, may be drivingly connected to shaft 46, and thus the latter be run at the constant and high speed desired for idle motions of the tools.

Figure 4:
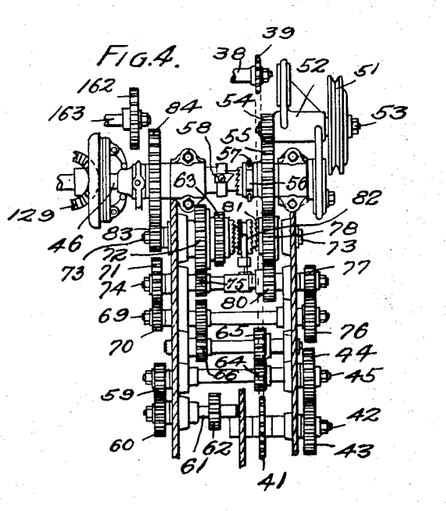
Fig. 4 is a rear view with parts in section, of the feed shaft and feed gear box with some of the parts shown out of position to better illustrate the construction.
Figure 5:
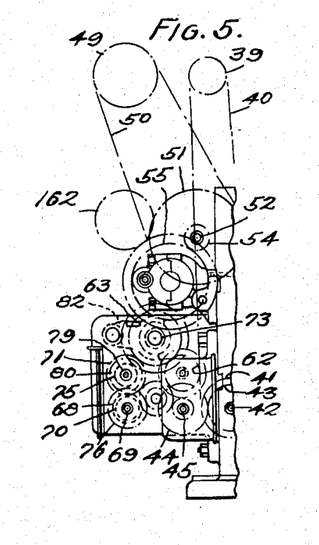
Fig. 5 is an end elevation of the same with the shafts in their proper position.

The several trains of gearing for changing the feed shaft speed, are best shown in Figs. 4 and 5 (being shown out of proper relation to some extent in Fig. 4 to clarify the illustration), and they will now be described.

Shaft 45, has keyed to it hand change gear 59, meshing with hand change gear 60, keyed to shaft 61, to which shaft is also keyed pinion 62, meshing with clutch gear 63. Also keyed to shaft 45, is pinion 64, which through reduction gears 65 and 66, keyed to shaft 67, and gears 68, keyed to shaft 69, drives shaft 69. On one end of shaft 69, is hand change gear 70, meshing with hand change gear 61, which drives ratchet gear 72, on shaft 73, through shaft 74 and pinion 75. Also keyed to shaft 69, is change gear 76, meshing with change gear 77, which drives clutch gear 78, through shaft 79 and pinion 80. Clutch gears 63 and 78, are free to rotate on shaft 73, to which is slidably keyed clutch sleeve 81, so that shaft 73, may be driven either by clutch gear 78, clutch gear 63, or by neither, in which case, ratchet gear 72, picks up the load. Clutch sleeve 81, is operated by yoke 82, in the manner hereinafter described. Keyed to shaft 73, is pinion 83, meshing with ratchet gear 84, which is keyed to shaft 46. It is therefore seen that shaft 46, may be driven at any one of three varying speeds by spindle 11, through ratchet gear 84, or when clutch sleeve 56, is brought into mesh with clutch 58, it may be driven at a high constant speed by pulley 14. In this case, shaft 46, rolls away from ratchet gear 84.

As has been stated, the feed shaft 48, drives turret cam drum 85, and which revolves on shaft 86, through a gear connection which includes a bevel gear 86, on the feed shaft, meshing with a like gear 88, on a worm shaft 89, and a worm wheel 90, on the drum end. The cam path 91, of the drum engages a cam roll 92, secured to the underside of a bar 93, longitudinally movable of the slide for adjustment. In order to get the drum and slide as close together as possible and secure a substantially direct thrust from the cam on the slide roller in the direction of travel of the slide in cutting, the drum is situated excentrically above the center of the circular door or hole 96, which is provided in the end wall of the machine frame for inserting the drum, and the center of which door hole must be sufficiently low to provide metal enough at the frame top to give adequate strength. The turret unlocking and revolving mechanism is not shown, as it forms no part of the present invention. It is sufficient to say that the motions of such parts are derived from a gear 98, secured to the cam drum, 85.

Figures 6, 20:
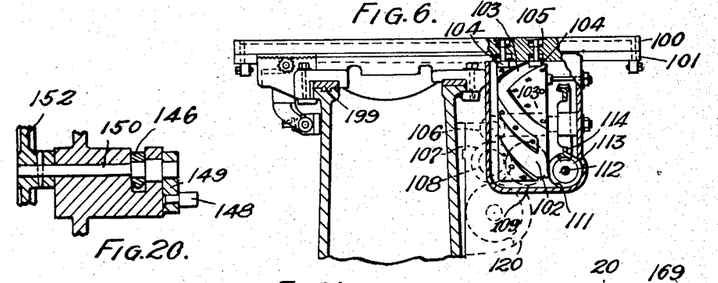
Fig. 6 is a cross section on line 11—11 of Fig. 1.
Figs 17 to 20 are detail views thereof.
Figure 7:
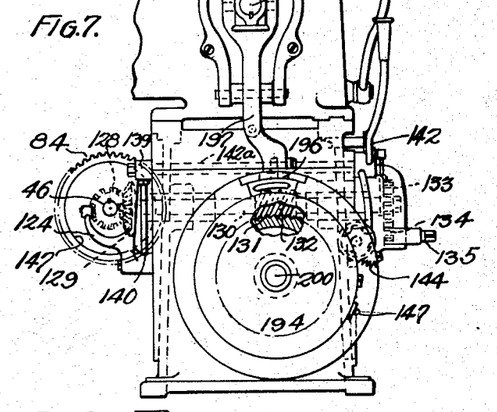
Fig. 7 is an end elevation of the headstock end of the machine showing the control dog drum and the back facer mechanism.

The cross slide 100, on a base 101, is reciprocated by a cam drum 102, which with its associated parts is mounted outside the machine base or housing, see Fig. 6, wholly to one side of the work chuck, so that chips or cuttings from the work do not fall thereon, but have a clear open space in the housing directly below the chuck in which to fall, and so that the cam drum and its associated parts are very readily accessible. The cam drum has two, or plural sets of cams 103 and a corresponding number of rolls or studs, 104, are attached to the cross slide for the respective cams, and the cams are spaced circumferentially of the drum, so that they both are within the planes of the drum sides so they come into action in succession on their respective studs, the action being that movement is imparted to the slide first by one cam and its stud, and then in the same direction by another cam and its stud. By this arrangement the cam drum can have only half the width, when there are two cams and studs required for a single cam and stud for the same travel of the cross slide. Each stud 104, comprises a head which is engaged by the cam and a reduced stem or spindle 105, journalled in ball bearings in the cross slide. The less friction on the stem than between the head and cam assures the revolution of the stud, or roller, from the cam friction, and obviates a defect of the usual roller construction which does not revolve.

The cross slide drum is driven by the feed shaft as follows: On the feed shaft is gear 106, which meshes with gear 107, loose on shaft 108, and having a clutch face with which may be meshed or unmeshed the opposing clutch face of a sliding gear 108. This gear meshes with an intermediate gear, 109, which meshes with gear 111, on shaft 112. Keyed to shaft, 112, is worm 113, meshing with worm gear 114, which is screwed to cam drum 102, and thus drives it. The feed thrust on cam 102, is taken up by opposite shoes, 115, and 116, placed to take the thrust.

As has been before stated, slidable gear 108, may be meshed with or unmeshed from gear 107, and thus impart motion to the cross slide drum or stop it. It is thus possible to stop the drum when it is not desirable to operate the cross slide, and that results in doing away with a lot of vacant cam surface on the drum, and making it possible to use a much smaller drum for a given cam angle and throw. The shift of gear 108, to drive, or stop the cam drum is done automatically and by mechanism that maintains its synchronism with the correlated parts of the machine, and that will now be described. The machine runs on the cycle principle, that is to say, all operations are complete within one cycle of control drum of dog wheel and therefore, all operations must take place in a certain number of turns of the feed shaft and must be exactly synchronized with it. For illustration, assume that 100 revolutions of the feed shaft make one cycle and that the ratio of gears 106, 107, 108, 109 and 111, is 1 to 1. Clutch gear 107, has in it pin or projection 117, which meshes with the slots in Geneva plate 118, and this gives it intermittent motion. As there are four slots in the Geneva plate, four revolutions of gear 107, give one revolution of the Geneva plate. On the end of the Geneva plate is a pin 119, which meshes with the teeth of gear 120, which has twenty-five teeth, therefore, one hundred revolutions of gear 107, produces one revolution of gear 120 and thus gear 120, makes one revolution for every cycle of the machine. Keyed to gear 120, is a cam 121, which by means of a cam roll 122, in cam roll bearing 123, shifts clutch gear 108, by means of yoke, 124. Cam, 121, has two lands on it as shown, corresponding to the two positions of sliding clutch gear, 108, and has various rises to shift from one land to another. These rises are so spaced as to take place when gear 124, indexes one tooth, and as the drive of gear 124, from gear 107, is intermittent the rise takes place in a very small arc of rotation of gear 107. As shown, these rises and dwells on cam 121, are spaced to give clutch gear 108, fifty-two revolutions stop, eight revolutions ahead; twelve revolutions stop, eight revolutions ahead; twelve revolutions stop, and eight revolutions ahead, thus making a total of one hundred revolutions, or one cycle. Gear 107, has but one tooth on it corresponding with one slot in clutch gear 108. As the shifting of gear 108, is done directly by gear 107, and in a slow, angle of rotation of the same it follows that gear 108, will always mesh with gear 107, in exactly the same relative position and will always return to neutral at exactly the same place. Gear 108, is further located while in neutral by pin, 125, which meshes with slot 126, in clutch gear 108.

No claim is made herein to the specific automatic mechanism illustrated in Figs. 22 to 25, as the same forms the subject of another application for patent.

The feed shaft (see Figs. 8, 9, 13 and 14) drives control or dog drum, 127, through bevel gears 128, and 129, worm shaft 130, worm 131, and worm gear 132, keyed to drum 127. Also keyed to shaft 130 is gear 133, with which pinion 134, on shaft 135, may mesh by being slid axially so that by the application of a crank to shaft, 135, the cam drums may be revolved by hand, in setting up the machine.

The dog wheel, by an adjustable dog, 136, actuates the stop clutch 47, which operatively connects the shaft 46, and the feed shaft 48, said dog 136, at the appointed time engaging and swinging stop lever, 137, which is on rock shaft 138, that has a crank 139, (Figs. 1 and 9) that by link 140, is connected to and actuates the yoke 124. The stop lever 137, has a handle for hand movement.

A safety device, not needing to be described, which is operated by the stop lever 137 prevents shifting of the pinion, 134, for the hand movement of the cam drums while the power drive is connected to the feed shaft.

Clutch 81, which controls the fast and slow motion of the tool slides through the feed shaft is operated by an adjustable dog 141, on the dog wheel which acts on a lever 142, on a shaft 142a (see Figs. 1 and 8 to 19) that actuates the clutch yoke, 57. The dog 141, engages spring held trip finges 144, pivoted to the lever, 142 until a push rod 145, pinned to the lever is locked by a pivoted latch, 146, that snaps into a notch in the push rod, and thereby the clutch, 58, is thrown to start the tool feed for cutting, and when the cut is finished another dog 147, releases the latch by contact with a pin 148, on a lever 149, on the rock shaft 150, to which the latch 146 is fixed. this release of the latch permitting the push rod to be moved by spring 151 and the clutch, 58 moved to connect the feed shaft with the high constant speed motion. The latch 146, may be released by a hand wheel 152 on the rock shaft 150.

Clutch thimble 34, which starts and stops the spindle, is controlled by dogs 153, on dog drum 127, that act to swing lever 154, on rock shaft 155, crank 156, link rod 157, bell crank 158, link rod 159, crank, 160, rock shaft 161, and yoke 35 on the rock shaft. (See Figs. 1 and 3.)

The spindle speeds and the tool feeds are automatically controlled by dogs on the dog wheel, but the actual shifting of the clutches is done by rapidly acting means whose motion is produced independently of the slow moving dogs, the dogs, by the quick release of latches, simply determining which clutch operating device shall be connected with said rapidly and constantly acting means. This will now be explained by reference to Figs. 1 to 5 and 8 to 19. Meshing with and driven by gear 55, is gear 162 (shown out of place in Fig. 4) on shaft 163, to which shaft is keyed worm 164, meshing with worm gear 165. Driven by worm gear 165, is a disk, 166, which carries a pivoted block 167, sliding in slotted lever 168, on shaft 169, to which is keyed crank 170, that has a pin and slot connection 171, with a reciprocating block 172, so that the latter is constantly moved to and fro.

Beneath the block 172, are a number of parallel bars 173, one for each clutch that is to be shifted, to each of which fingers 174, are pivoted that may swing vertically to engage the free ends with or to disengage them from notches 175, in the underside of the sliding block 172. Each notch has an abrupt and a bevelled end, and when a finger is engaged by an abrupt end the sliding block then moves along with it the bar 173, to which the finger is attached, and shifts the appropriate clutch, causing clutch engagement of gears and shafts or placing clutches in neutral position. The bevelled ends of the notches are to assure disengagement of the fingers by a camming action thereon. Pivoted beneath each finger is a bell crank lever 176 (see Fig. 15) with a horizontal arm beneath a finger and a vertical arm in position to be engaged by one end of a horizontal rod 177, whose other end has a plunger 178, slidable in a box 179, and which is acted on by a coil spring 180, in the box which tends to move the rod, in the direction to swing a bell crank to lift the appropriate finger into engagement with the slidable block 172, but which is restrained from such action by a latch pin 181, that engages a shoulder on the plunger. The latch pin is pivoted to the upper arm of a lever, 182, pivoted to the box, whose other arm has a trip finger 183, in the path of a dog 184, on the dog wheel, or drum 127 and adjustable to any desired position, so that when the lever is engaged and moved by the dog, the latch pin will be withdrawn and the plunger released so that instantly the spring will act to move the rod to lift the appropriate finger into block engaging position. When the finger is engaged by the bevelled end of the block notch when the block reciprocates in that direction, the plunger is moved to compress the spring and to enable the latch pin to re-engage it.

There are two fingers on each bar 173, and they face in opposite directions. For throwing a clutch into neutral, the arrangement shown is employed in which a single lifting arm, 176a, carried by one bell crank 176, acts on both fingers so that whichever way the block moves it will act on a finger, and the notches are elongated to allow lost motion before a finger and the bell crank are depressed.

The bars 173, for shifting the spindle speed clutches, 23, and 27, are connected, respectively, by rods, 185 and 186, to the levers 187, which are connected to the sleeves of the clutches, 23 and 27 respectively by sliding rods 192 and 193 respectively, and the bar 173, for shifting the clutch 58, for changing the rate of speed of cutting is connected by a rod 173a, to the yoke 57, for sliding the clutch 58, by means of a bell 188, a link rod 189, a bell crank 190, and rod 191.

Figure 8:
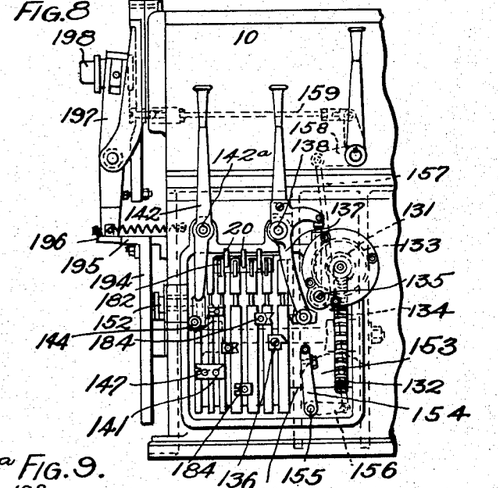
Fig. 8 is a side elevation thereof.
Figure 9:
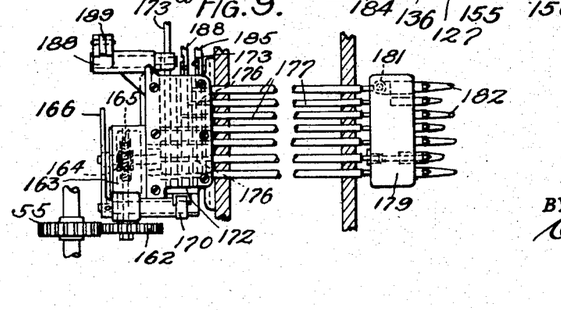
Fig. 9 is a plan view of the clutch operating mechanism.
Figures 10, 11, 12, 13, 14, 15, 16, 17, 18, 19, 21:
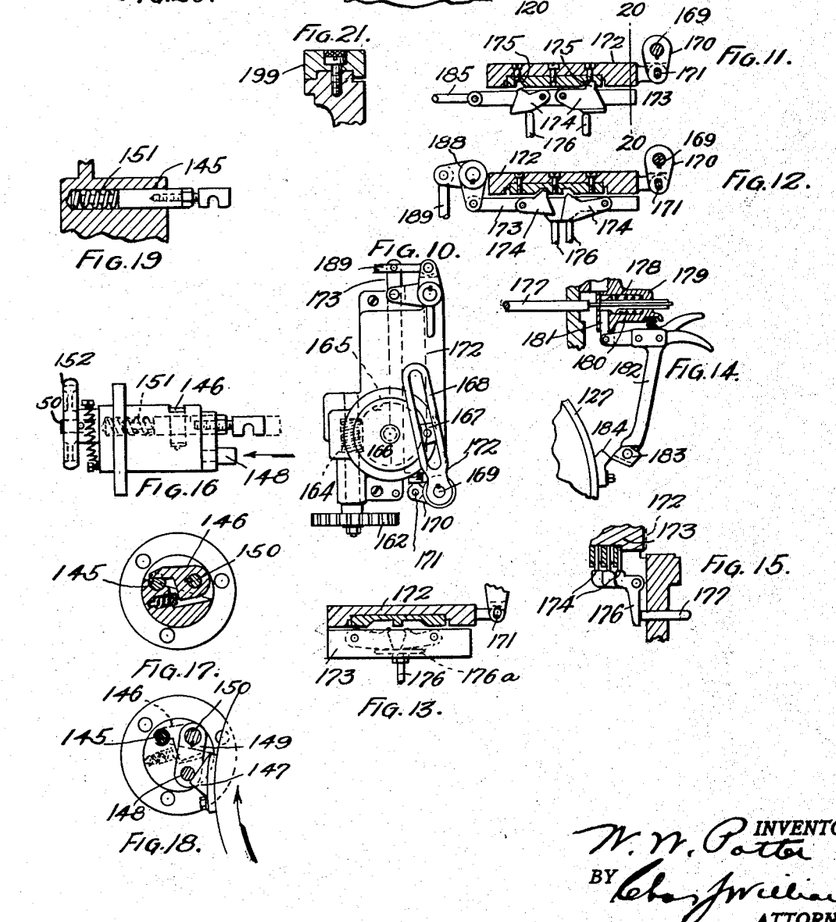
Fig. 10 is an end view of the shipping box thereof.
Figs. 11, 12 and 13 are detail views of shipping mechanism.
Fig. 14 is a section on the line 19—19, Fig. 9.
Fig. 15 is a section on line 20—20, Fig. 11.
Fig. 16 is a detail view partly in section, of the latch block for the feed control.
Fig. 21 is a detail cross section of one of the slide ways.
Figures 22, 23, 24, 25, 26:
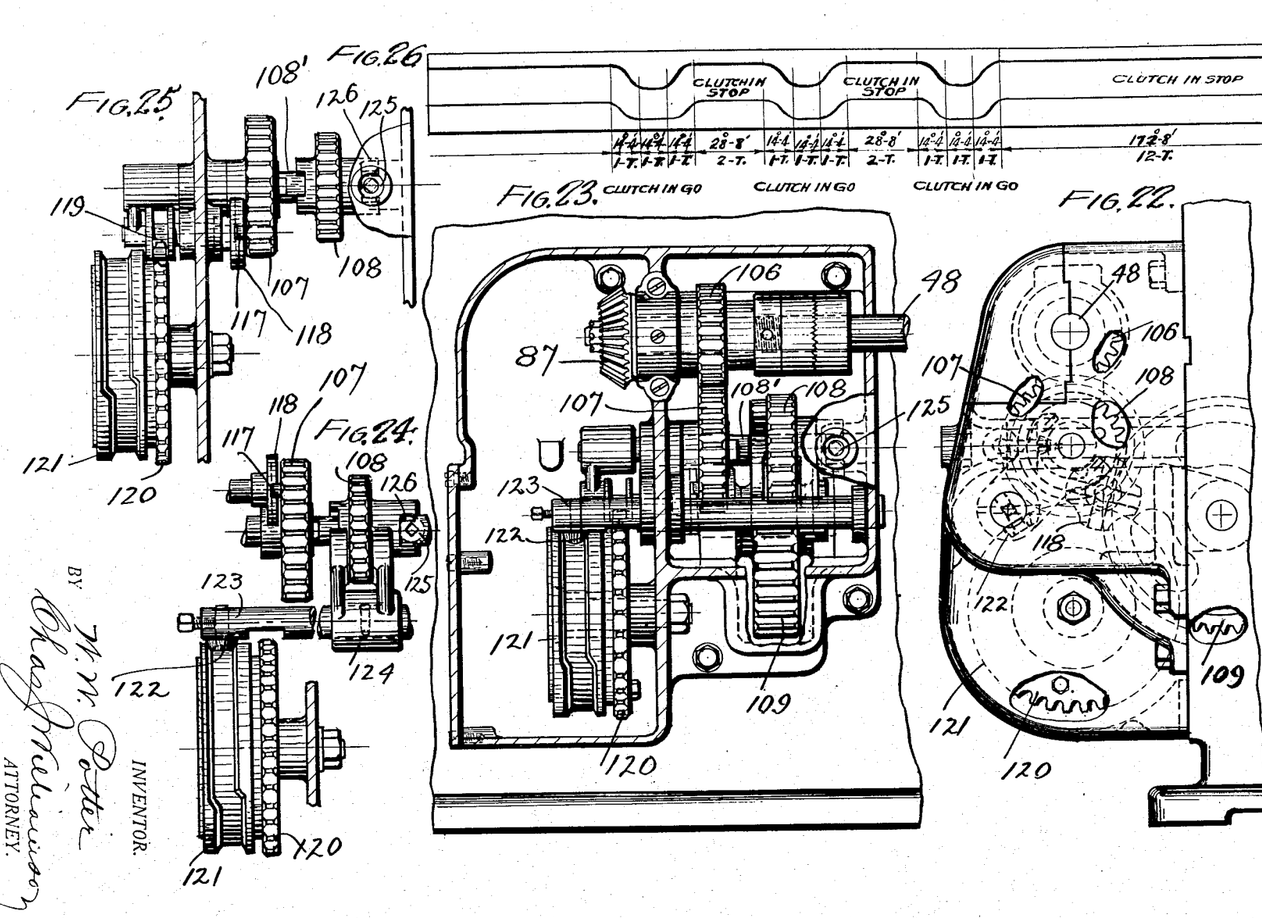
Fig. 22 is an end elevation of the timing box, looking from the headstock.
Fig. 23 is a rear elevation of the same, partly in section.
Fig. 24 is a detail of the timing box showing the clutch shifting mechanism.
Fig. 25 is a detail view of the cam indexing mechanism of the timing box.
Fig. 26 is a diagrammatic view showing the development of the timing cam.

The back facing attachment as shown in Figs. 8 and 9 is easily applied by extending the dog wheel shaft 200, through the head end of the base, and keying thereto, a cam carrying disk, 194, which carries a cam, 195 operating on roll, 196, on the end of lever 197, and thus feeding back facer bar 198.

The ways of the bed of the machine are formed each as a removable bolt-attached strip 199, which is preferably hardened steel. This strip can be trued simply by grinding, and thus the great labor and expense which scraping the ways as ordinarily constructed is saved. A strip can be removed and sent to the factory for regrinding or replacing by a new one.

What I claim is:

1. A machine tool having multiple tools which act at different times, a member or members whose motions are to be controlled and a control mechanism comprising a shiftable member, constantly moving means for moving said member, a part movable by said member when the latter is moved directly acting on said member whose motions are to be controlled, and a moving member of the machine that causes such means to act.

2. A machine tool having multiple tools which act at different times, a member or members whose motions are to be controlled and a control mechanism comprising a shiftable member, constantly moving means for moving said member, a part movable by said member when the latter is moved directly acting on said member whose motions are to be controlled, and a slow moving member of the machine that causes such means to act.

3. A machine tool having multiple tools which act at different times, a member or members whose motions are to be controlled and a control mechanism comprising a shiftable member, constantly moving means for moving said member, a part movable by said member when the latter is moved, directly acting on said member whose motions are to be controlled, and a moving member of the machine that causes such means to act, that is adjustable to change its time of action.

4. A machine tool having multiple tools which act at different times, a member or members whose motions are to be controlled and a control mechanism comprising a shiftable member, spring-actuated means for moving said member, a part movable by said member when the latter is moved directly acting on said member whose motions are to be controlled, and a moving member of the machine that causes such means to act.

5. A machine tool having multiple tools which act at different times, a member or members whose motions are to be controlled and a control mechanism comprising a shiftable member acting upon one of said first-mentioned members whose motions are to be controlled, a spring to move said shiftable member in its operating movement, a latch to restrain the action of said spring, and means to release such latch.

6. A machine tool having a member or members whose motions are to be controlled and a control mechanism comprising a shiftable member, a spring to move said shiftable member in its operating movement, a latch to restrain the motion of said spring, a dog to release such latch, and a dog carrier with which the dog is adjustably connected.

7. A machine tool having a member or members whose motions are to be controlled and control mechanism comprising a constantly moving to and fro moving member, a bar normally stationary, a movable device adapted to connect and disconnect said member and said bar, quickly acting means to move said device to connect them, and a slow moving member of the machine to cause the action of said quickly acting means.

8. A machine tool having a member or members whose motions are to be controlled and control mechanism comprising a constantly moving to and fro moving member, a bar normally stationary, a pair of oppositely acting devices carried by said bar for connecting and disconnecting the same and said member, and a moving member of the machine to actuate said devices to engage said to and fro moving member.

9. In a machine tool the combination of a spindle, a driving wheel, means to revolve the spindle from the wheel, a tool carrier, a tool feed shaft, a high and constant speed revolving member drivingly connected with said wheel, means to drive said feed shaft from said high speed member at a higher speed than its tool feed revolution, a gear connection between the spindle and the feed shaft that is active during feed revolutions of the feed shaft, and means to connect and disconnect said wheel and the spindle.

10. A machine tool having a supporting base, a work-spindle situated at substantially the transverse center of the base, a tool slide movable towards and from the work-spindle, a cross slide situated between said tool slide and the work-spindle, and cross slide moving mechanism situated in a sidewise direction wholly to one side of the space where the tools cut the work in the spindle.

11. A machine tool having a supporting base, a work-spindle situated at substantially the transverse center of the base, a tool slide movable towards and from the work-spindle, a cross slide situated between said tool slide and the work-spindle, cross slide moving mechanism situated in a sidewise direction wholly to one side of the space where the tools cut the work in the spindle, and comprising a cam on the outside of the base.

12. A machine tool comprising a housing form base, a tool slide on the top of the base, a horizontal cam drum that engages at the top a part connected with the tool slide to move it said housing base having an opening for passing the cam drum into the base, and means to support the cam drum within the base with its upper part higher than the top of said opening.

13. In a machine tool the combination of a tool slide, a cam drum to move the slide, and automatic means to revolve the cam drum intermittently that preserves the synchronism thereof with other moving members of the machine.

14. In a machine tool the combination of a reciprocating tool slide, a drum, a plurality of cams on the drum, and a plurality of parts on the slide for coaction with respective cams situated for successive engagement by the cams.

15. In a machine tool the combination of a spindle, a constant speed driving wheel, means to revolve the spindle from the wheel, hand means to change the ratio between the revolutions of the driving wheel and the spindle, power operated means for automatically and instantaneously changing such ratio, tool carriers, a tool feed shaft operating said carriers, means to revolve the feed shaft from the spindle, hand means to change the ratio between the revolutions of the spindle and the revolutions of the feed shaft, power operated means for automatically and instantaneously changing the last named ratio, a high and constant speed revolving member drivingly connected with the constant speed drive wheel, means to drive said feed shaft from said high speed member at a higher speed than its tool feed revolution and means for automatically connecting and disconnecting said high speed member and said feed shaft.

16. In a machine tool the combination of a spindle, a constant speed driving wheel, means to revolve the spindle from the wheel, hand means to change the ratio between the revolutions of the driving wheel and the spindle, power operated means for automatically and instantaneously changing such ratio, tool carriers, a tool feed shaft operating said carriers, means to revolve the feed shaft from the spindle, hand means to change the ratio between the revolutions of the spindle and the revolutions of the feed shaft, power operated means for automatically and instantaneously changing the last named ratio, a high and constant speed revolving member drivingly connected with the constant speed drive, means to drive said feed shaft from said high speed member at a higher speed than its tool feed revolution, means for automatically connecting and disconnecting said high speed member and said feed shaft, and means to connect and disconnect said constant speed drive wheel and said spindle.

17. The combination of a work spindle, a tool carrier, means to revolve the spindle, means to impart feeding motion to the tool and automatic control mechanism that regulates the rate of tool feed relative to spindle speed while the tool is acting on the same work-piece that comprises a shiftable member, means for constantly moving said member, a part movable by said member when the latter is moved, directly acting to regulate the rate of tool feed relative to spindle speed, and a moving member of the machine that causes such means to act.

18. The combination of a work spindle, a tool carrier, means to revolve the spindle, means to impart feeding motion to the tool and automatic control mechanism that regulates the rate of tool feed relative to spindle speed while the tool is acting on the same work-piece, that comprises a shiftable member, means for constantly moving said member, a part movable by said member when the latter is moved directly acting to regulate the rate of tool feed relative to spindle speed, and a moving member of the machine that causes such means to act, means for maintaining ratio of spindle speed and tool feed and automatic means for varying the spindle speed.

In testimony whereof I hereunto affix my signature.

WILLIAM WALLACE POTTER.